Figure 1:
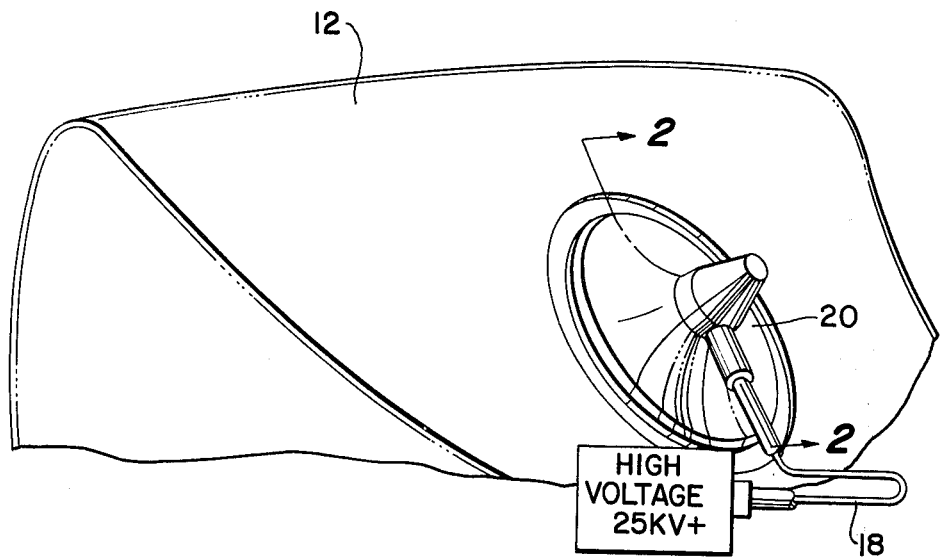

United States Patent [19]

Hall

[11] 4,418,171

[45] Nov. 29, 1983

[54] ANTI-TRACKING MATERIAL FOR HIGH VOLTAGE APPLICATIONS

[75] Inventor: Harold E. Hall, Middlefield, Ohio

[73] Assignee: Blasius Industries, Inc., Bedford, Ohio

[21] Appl. No.: 348,322

[22] Filed: Feb. 16, 1982

Related U.S. Application Data

[62] Division of Ser. No. 228,280, Jan. 26, 1981, abandoned.

[51] Int. Cl.$^3$ .............................................. C08K 5/54
[52] U.S. Cl. ................................... 524/268; 524/267; 339/258 TC
[58] Field of Search .............................. 524/268, 267; 339/258 TC

[56] References Cited

U.S. PATENT DOCUMENTS

| | | | |
|---|---|---|---|
| 2,803,619 | 8/1957 | Dickmann | 260/42 |
| 2,882,430 | 4/1959 | Nordby | 313/64 |
| 3,258,732 | 6/1966 | Martin | 339/59 |
| 3,532,537 | 10/1970 | Richards | 117/132 |
| 3,795,646 | 3/1974 | MacKenzie, Jr., et al. | 260/29.1 SB |
| 3,929,704 | 12/1975 | Horning | 260/29.1 |
| 3,933,712 | 1/1976 | Vanaglash, Jr. | 260/29.1 |
| 4,022,747 | 5/1977 | Itoh | 260/37 |
| 4,204,741 | 5/1980 | Hall | 339/200 P |

FOREIGN PATENT DOCUMENTS

2817105 11/1978 Fed. Rep. of Germany.

OTHER PUBLICATIONS

Product Data Sheets: No. SE5559U, No. SE435, MR-1, 550; articles from Modern Plastics Encyclopedia 1975-1976 and 1976-1977.

Primary Examiner—Joseph L. Schofer
Assistant Examiner—Bernard Lipman
Attorney, Agent, or Firm—Body, Vickers & Daniels

[57] ABSTRACT

A silicone rubber composition for electrical connector housings having increased resistance to tracking and the ability to cure the damage caused by tracking should it occur. A heat during silicone rubber and a non-curing silicone oil incompatible with the silicone rubber are combined with the liquid oil dispersed throughout the solid rubber and molded into desired shapes.

17 Claims, 2 Drawing Figures

ANTI-TRACKING MATERIAL FOR HIGH VOLTAGE APPLICATIONS

This is a division of application Ser. No. 228,280 filed Jan. 26, 1981 now abandoned.

This invention pertains to the art of electrical insulating compositions and, more particularly, to a composition for use with electrical connectors having superior insulating and anti-tracking characteristics at very high voltages.

The invention is particularly applicable for use in the anode cups used to feed high voltages to the anode through the side of a cathode ray tube of the type used to provide color television pictures and will be described with particular reference thereto although it will be appreciated that the invention has other and broader applications, for example, in insulating caps used on spark plugs of ignition type internal combustion engines or in any other application where high voltage electrical insulation must exist along two abutting surfaces of electrically insulating materials.

Anode cups normally consist of a metal clip connected by an insulated wire to a source of ultra-high voltage, e.g., 20,000 kilovolts or more, and positioned inside of a circular disc of a flexible rubber-like insulating compound having a smooth shallow concave lower surface. The clip engages a button in the side of a cathode ray tube functioning as the picture tube in a television receiver or the like and presses the smooth lower surface of the disc into firm pressure engagement with the outer surface of the glass of the tube. Immediately surrounding the outer edges of the disc is a metal coating on the surface of the tube which is connected to negative ground. Thus, in the short distance between the button (or clip) and the grounded metal coating, there is a very high voltage gradient. As the voltage applied to the anode button increases, a voltage is reached where the path between the anode button and metal shield along the surface of the anode cup ionizes and an electric arc or spark results. This is known as the breakdown voltage. The maximum breakdown voltage which has heretofore been able to be reliably achieved is 40 kilovolts.

The undersurface of the anode cup or disc is made as smooth as possible and is held in firm pressure engagement with the outer surface of the tube, the effort being made to eliminate any air pockets in the interface which can ionize and lower the breakdown voltage. It has been easy to make the lower surface of the cup ultrasmooth by so configuring the surface of the molding disc. However, as a result of the manufacturing process, the cathode ray tube glass surface has always had slight surface irregularities which result in tiny air pockets in the interface. The presence of such air pockets has limited the maximum breakdown voltage as the air can ionize to form a track.

When the breakdown voltage is exceeded, the heat generated by the arc (or spark) burns or chars the surface of the anode cup and/or etches a line in the glass surface of the picture tube. This is known as tracking. Once tracking has occurred, the breakdown voltage is substantially lowered. Replacement of the anode cup is usually required.

For brighter pictures on a television picture tube, efforts have been made to increase the anode voltage beyond the 40 kilovolts heretofore employed. To date, the breakdown voltage of the anode cup has been the limiting factor in the maximum anode voltage which can be supplied to the picture tube.

A further place where breakdown voltages have become important is in the ignition systems of internal combustion engines. Here it is conventional to provide a metal clip connected to a source of high voltage and positioned in a rubber-like cup which fits like a cap over the insulator of the spark plug to prevent the high voltages from ionizing a path from the high voltage terminal of the spark plug to the grounded metal base of the spark plug and causing an arc (or spark). In recent years, efforts have been made to increase the voltage applied to spark plugs in an effort to increase the efficiency of combustion and to reduce pollutants. The ability of the cap to prevent the ionization of the path from the plug terminal to ground and thus the formation of an external spark or track has been a limiting factor on the maximum voltage which can be supplied to the terminal.

Heretofore various formulations have been developed for anode cups and spark plug boots to increase tracking resistance. A typical elastomer used is produced as a proprietary product by The General Electric Company and identified by their product code SE55-59U. It is a methyl silicone rubber designated ASTM VMQ. This is a flame retardant, high di-electric material. Alumina trihydrate is often added as a filler in the fabrication of anode cups because such material appears to increase the arc resistance of the finished part. In any event, none of such improvements appear to equal the tracking resistance of the present invention and none of such materials appear to be self-healing as in the present invention.

The present invention contemplates a new and improved formulation for a rubber-like composition of a cup or cap which is adapted to be in abutting electrical insulating relationship with another insulating surface which overcomes all of the above referred to difficulties and others and enables the obtaining of higher breakdown voltages than ever heretofore achieved, as well as having a self-healing characteristic in the event of the breakdown voltage having been exceeded.

THE INVENTION

In accordance with the present invention, there is provided for use in insulating cups or caps a composition of matter comprised of a curable elastomer and an insulating oil incompatible with the elastomer dispersed throughout the elastomer which composition can be easily fabricated into a flexible cap or cup for engagement with another insulating member wherein the oil can migrate through the elastomer to a surface.

Further in accordance with the present invention, there is provided for use in insulating cups or caps a composition of matter comprised of a silicone rubber elastomer having an incompatible silicone oil dispersed throughout the elastomer which composition can be easily fabricated into a flexible cap or cup for engagement with another insulating member.

Further in accordance with the invention, there is provided a composition of matter comprised of a methyl silicone rubber, ASTM, class MQ, or vinyl methyl silicone rubber, class VMQ; a reinforcing filler; a curing agent; and, importantly, a non-compatible silicone oil.

Further in accordance with the invention, there is provided an insulating cap or cup having a surface adapted to be in abutting engagement with another insulating surface which cap or cup is comprised of a molded mixture of a methyl silicone rubber, ASTM, class MQ, or vinyl methyl silicone rubber, class VMQ; a reinforcing filler; a curing agent; and, a non-compatible silicone oil dispersed throughout the cap or cup.

Tests have shown that the non-compatible silicone oil remains in the liquid form and continuously bleeds out of the body of the cup or cap to the surfaces. In effect the surface continuously has an oily feeling which, if dried or wiped off, soon regains its oily feeling. The silicone oil on the surface appears to fill any voids in the abutting interface of the rubber cap or cup and the opposite insulating surface thus eliminating the air pockets which heretofore have limited the maximum breakdown voltage. Further, it has been found that if there is a breakdown which causes tracking and which would normally result in a permanent lower breakdown voltage, instead the non-compatible silicone oil bleeds out of the cup or cap, fills the track and in a few hours the breakdown voltage has been substantially increased and in 24 hours the breakdown voltage has been restored substantially to its original value. In the case of anode cups for television picture tubes, the breakdown voltage achieved is in excess of 60,000 volts or 60 kilovolts.

OBJECTS

The principal object of the present invention is to provide an insulating composition having exceptionally high tracking resistance.

A further object of the present invention is to provide a material which is capable of recovering from a tracking failure to full tracking resistance or close to full tracking resistance.

Yet another object of the present invention is the provision of a material which will interact with a glass-like surface to exclude air and other gases capable of ionizing and promoting tracking failures thereby providing electrical shielding at the interface.

Yet another object of the present invention is the provision of a composition which will fill any voids created by a tracking failure between itself and an associated glass-like surface thereby returning the interface to original or near original tracking resistance should a tracking failure occur.

DRAWINGS

The invention may take physical form in a number of different environments. As stated earlier, the composition may be used in anode cups, spark plug boots, and as insulation and shielding in other high voltage applications. The invention will be described and illustrated in detail as used in anode cups in the specification.

Figure 2:
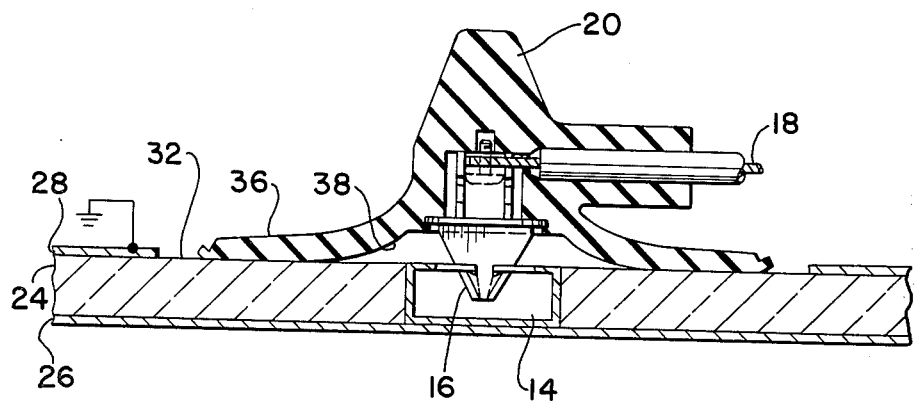

A preferred embodiment of the invention is illustrated in the accompanying drawings wherein:

FIG. 1 is a perspective view of an anode cup in place used to shield and insulate the anode connection on a television picture tube or cathode ray tube; and, FIG. 2 is a cross sectional view taken along the line 2—2 of FIG. 1 illustrating an anode cup in section.

PREFERRED EMBODIMENT

Referring now to the drawings wherein the showings are for the purpose of illustrating an article of manufacture made from a preferred embodiment of the invention and not for the purposes of limiting same, FIGS. 1 and 2 show a cathode ray tube 12 having a standard anode button 14 embedded in its side and an anode connector comprised of an anode clip 16, an anode wire 18 and an anode cup 20.

Cathode ray tube 12 is conventional and is comprised of a thick glass tube envelope 24, a metal inner layer 26, a metal grounded outer layer 28 and an open glass surface area 32 in the area of and surrounding the anode button 14. The surface area 32 is not a polished surface and is somewhat textured.

The anode to cathode voltage in a color television set is typically in the range of 25 to 50 kilovolts DC. Insulation of the anode connection is therefore required to prevent corona discharge, arc over to the layer 28, and danger to consumers from contact with a high voltage source. Because of the high voltages involved, ionization of any air pockets between the anode button and the outer layer can result in such an arc being formed with resultant damage to the cup and/or tube.

Silicone rubber anode cups are shaped to provide a shield surrounding the anode connection. The anode cup 20 has a skirt 36 with an extremely smooth undersurface 38. Skirt undersurface 38 is pressed against the contour of the glass surface 32 thereby minimizing trapped gas between the skirt and the glass plate which could ionize. Because surface 32 is not perfectly smooth, not all air can be excluded. The interface between the glass surface 32 and the anode cup 20 is the shortest path from anode button 14 to grounded outer layer 28, and it is critical that insulation be maintained at this interface.

Shielding has not always been successful in the past. Ionization of gas or air trapped between the skirt 36 and the glass surface 32 results in paths of lower tracking or arc resistance. Tracking can occur along these paths. Once tracking occurs, the skirt undersurface 38 is charred, providing a permanent path of less resistance for further arcing between the anode connection and the grounded surface 28.

In the present invention cap 20 is fabricated from a novel composition which overcomes many of these objections.

The composition is comprised of: a silicone rubber compound formulated to have the desired flexibility and chemical properties needed for the cap; a filler such as alumina trihydrate ($Al_2O_3.3H_2O$) which increases the tracking resistance of the silicone rubber compound selected; a curing agent reactive with the silicone rubber compound selected; and, a silicone oil that is incompatible with the silicone rubber used. The formulation is shaped and heat cured by transfer molding or a similar process. The resulting part is comprised of all the ingredients (except the silicone oil) combined into a solid phase and the incompatible silicone oil in the liquid phase dispersed throughout the part. The incompatible oil does not react with silicone rubber or filler or go into solution. Instead, it remains liquid and can migrate through the solid phase to the surface of the cured rubber part after fabrication. The surface of the molded part has an oily feel to the hands which can be wiped dry but which will in time regain its oily feel.

This incorporation of an incompatible silicone oil in the silicone rubber part has far-reaching and unexpected results.

First, the voltage at which tracking failure occurs is greatly increased. In an anode cup fabricated from a formulation not including silicone oil, breakdown occurred at 40,000 volts through tracking to the perimeter under controlled test conditions. The physically identical part including an incompatible silicone oil tested under identical circumstances did not break down at test voltages exceeding 60,000 volts.

Second, the silicone oil gives the cup 20 the ability to recover from tracking breakdown. A typical tracking breakdown occurs between the glass surface 32 and the underside of the skirt 38. A conductive track is formed at this interface and this conductive track heats and breaks down the undersurface of the skirt 38 and etches glass surface 32. This charred track subsequently provides an area of lowered resistance to tracking breakdown permanently impairing the anode cup 20. In the present invention, with the silicone oil added, the incompatible silicone oil migrates to the affected area, filling the area with the oil, thereby excluding ionizable gases, and returning the cup to its original tracking resistance strength. Applicant has found that the present invention allows a silicone anode cup to return to 80% of its tracking resistance strength within the first ten minutes. Twenty-four hours after failure the cup is returned to full tracking resistant strength.

Specific formulations found satisfactory in practice are given below.

FORMULATION 1
AN ANODE CUP FORMULATION
The following ingredients are formulated in the following percentages by weight:

| Ingredients | Percent |
| --- | --- |
| 1. Silicone Rubber Compound SE 5559 U (a General Electric proprietary formulation) | 55.0 |
| 2. Silicone Rubber Gum SE 435 (a General Electric proprietary formulation) | 10.5 |
| 3. Reclaim | 13.7 |
| 4. Alumina Trihydrate | 10.5 |
| 5. Silica Filler | 7.0 |
| 6. 2,5-Dimethyl-2,5-Di(t-butyl-peroxy) hexane | 1.0 |
| 7. MR-1 (a proprietary formulation of Dow-Corning Corporation) | 1.0 |
| 8. Silicone Oil - Dow-Corning 550 Fluid | 1.3 |
| Total | 100.0 |

Both silicone rubber compound SE 5559 U and silicone rubber gum SE 435 are unvulcanized methyl-vinyl-silicone rubbers. SE 5559 U is a "straight" elastomer without reinforcing fillers, extending fillers or processing aids added. SE 435 is an "R-Gum" already containing fillers and processing aids. Other methyl-vinyl-silicone rubbers could be used in the place of these two materials. The two specified materials are selected to provide the flexibility and other physical properties desired in the finished product. General Electric SE 5559 U also provides the added property of flame retardance. General Electric SE 435 readily accepts fillers such as alumina trihydrate used herein.

Both of the above-described elastomers are identified as Class VMQ by the American Society for Testing and Materials (ASTM). The nomenclature used here is set forth in ASTM Standard B-1418-79a wherein the classification is identified as "silicone rubber having both methyl and vinyl constituent groups on the polymer chain". Numerous elastomers in this class are available from sources such as Dow-Corning Corporation of Midland, Mich., The Stauffer Chemical Corporation and others.

Elastomers such as Class MQ, methyl-silicone rubbers, can also be fabricated with incompatible silicone oils to improve anti-tracking characteristics in accordance with the present invention. However, the VMQ class of silicone rubbers is best suited to the applications to which the present invention is primarily addressed.

The third listed ingredient, Reclaim, is recycled scrap of the same formulation. Scrap parts, mold flash, and other trimmings, are recycled by adding them to the formulation after devulcanizing.

The fourth ingredient, alumina trihydrate, is a mineral filler available from a great number of sources known to improve the tracking resistance of silicone rubber compositions.

Silica filler is a high purity, finely divided, silicon dioxide or sand used in silicone rubber compositions. An acceptable grade is available from the Pennsylvania Glass Sand Corporation under the trademark Min-U-Sil.

2,5-dimethyl-2,5-di(t-butyl-peroxy) hexane is a peroxide cross linking agent used to cure or vulcanize the silicone rubber compound. Numerous other curing agents are available. However, the preferred embodiment uses the above formulation obtained from the R. T. Vanderbilt Company, Inc. under the trademark Varox.

MR-1 is a modifier used to improve the mold release characteristics of complex parts fabricated from the above formulation. The incompatible silicone oil also adds to the mold release characteristics of the formulation and the MR-1 is not necessary in the formulation unless exceedingly complex shapes are to be fabricated.

The silicone oil specified in the formulation is a phenyl-methyl-silicone oil. It is incompatible with the silicone rubber formulation used and (after the silicone rubber cures) will remain in the liquid phase dispersed throughout the solid phase part. The silicone oil can migrate through the solid phase of the part after curing. This incompatibility and migration forms the heart of the present invention allowing a part to exude a dielectric liquid filler into any air space in the elastomer-glass interfaces and also into damaged areas in such interfaces to repair tracks formed by arcing failure.

The phenyl-methyl-silicone oil used in this embodiment has excellent electrical characteristics as well as incompatibility with the silicone rubber compound used. Thus, the high dielectric properties of silicone rubber are maintained at elastomer-glass interfaces and also in repaired track areas.

Most phenyl silicone oils and many other silicone oils are incompatible with Class VMQ or Class MQ elastomers. Any of these oils having suitable electrical and physical characteristics can also be used in the invention. The solubility of the selected oil in the selected rubber compound must be very low. Further, the silicone oil must be selected so as not to form a gel or other structure with the filler used nor to cure when subjected to the molding or curing temperatures of the elastomer.

The proportions of the above formulation can be modified to produce a finished composition of differing characteristics.

A second formulation particularly suited for fabrication of spark plug boots is set forth below:

FORMULATION 2
A SPARK PLUG BOOT FORMULATION

| Ingredients | Percent |
| --- | --- |
| 1. 30 durometer reinforced silicone rubber gum | 54.8 |

-continued

FORMULATION 2
A SPARK PLUG BOOT FORMULATION

| Ingredients | Percent |
| --- | --- |
| 2. Reclaim | 11.0 |
| 3. Aerosil 200 vs | 2.9 |
| 4. Min-U-Sil (5 micron) | 27.3 |
| 5. Red iron oxide | 1.1 |
| 6. 2,5-Dimethyl-2,5-Di(t-butyl-peroxy) hexane | 0.7 |
| 7. Silicone oil | 2.2 |
| Total | 100.0 |

The first ingredient, a 30 durometer reinforced silicone rubber gum is similar to Ingredient Number 2 in Formulation Number 1. Both of these gums are reinforced rubber gum compositions available from numerous sources such as General Electric and Dow-Corning Corporation. The two ingredients differ in that Ingredient Number 2 in Formulation Number 1 is a 35 durometer while Ingredient Number 1 in Formulation Number 2 is a 30 durometer, a softer more flexible material.

Ingredient Number 2 is recycled scrap of the same formulation.

Ingredients Number 3 and 4 are silica fillers which reinforce the elastomer and improve its electrical characteristics.

Ingredient Number 5, red iron oxide, improves the high temperature characteristics of the elastomer. This is called for because of the high temperature environment of spark plug boots at internal combustion engine cylinder heads.

The curing compound Varox is the same for both formulations. The silicone oil can be the same oil as Formulation 1 or a similar oil. In Formulation Number 2 the silicone oil is present in slightly higher amounts. Here again, the silicone oil will be exuded from the part repairing any tracking failure damage and filling the area between the boot itself and the spark plug insulator excluding air. The porcelain insulator portion of a spark plug presents a surface to the spark plug boot which is similar to the surface of a cathode ray tube presented to an anode cup.

The silicone oil in Formulation Number 2 operates in the same manner as in Formulation Number 1 to form a high voltage shield at the interface by exuding from the boot to fill any voids and repair any tracking damage.

Having thus described my invention, I claim:

1. In a high voltage insulated connector for a high voltage electrical connection to a device having an insulating surface surrounding said connection, said connector comprised of a metallic electrical clip, a cup formulated from an elastomeric insulating material surrounding said metallic clip and having a skirt with a surface adapted to be pressed against said insulating surface over a wide area, the improvement which comprises an insulating oil incompatible with said elastomeric insulating material dispersed throughout the material of said cup and exuding from said material to fill the interface between said skirt surface and said insulating surface.

2. The improvement of claim 1 wherein said elastomeric material is a silicone rubber and said oil is a silicone oil.

3. The improvement of claim 2 wherein said elastomeric material is methyl-silicone rubber.

4. The improvement of claim 3 wherein said elastomeric material is a methyl-vinyl silicone rubber.

5. The improvement of claim 3 or claim 4 wherein said silicone oil is a phenyl-silicone oil.

6. The improvement of claim 3 or claim 4 wherein said silicone oil is a phenyl-methyl-silicone oil.

7. The improvement of claim 1 wherein said elastomeric material is comprised of the following ingredients by weight percentage of the elastomeric material and insulating oil total weight:

| Ingredients | Weight Percent |
| --- | --- |
| Silicone Rubber | 40-99% |
| Mineral Filler | 0-60% |
| Curing Agent | 0.5-03% |
| Incompatible Oil | 0.25-20% |

8. The improvement of claim 7 wherein said silicone rubber is a methyl-silicone rubber.

9. The improvement of claim 7 wherein said silicone rubber is a vinyl-methyl-silicone rubber.

10. The improvement of claim 8 or claim 9 wherein said incompatible oil is a phenyl-silicone oil.

11. The improvement of claim 8 or claim 9 wherein said incompatible oil is a phenyl-methyl-silicone oil.

12. The improvement of claim 7 wherein said incompatible oil is present in the range of 0.5 to 5%.

13. The improvement of claim 7 wherein said incompatible oil is a phenyl-silicone oil.

14. The improvement of claim 7 wherein said incompatible oil is a phenyl-methyl-silicone oil.

15. The improvement of claim 7 wherein said incompatible oil is present in the range of 0.75 to 4.0%.

16. The improvement of claim 7 wherein said incompatible oil is present in the range of 1.0 to 3.5%.

17. A process for fabricating high voltage insulators comprising:
forming a mixture of a silicone rubber, a mineral filler, a curing agent for said silicone rubber and a silicone oil incompatible with said silicone rubber;
charging said mixture into a mold; and,
applying heat to said mold thereby curing said mixture into a solid elastomer part having a liquid silicone oil dispersed through said part.

* * * * *